United States Patent
Kohler

(10) Patent No.: US 8,812,257 B2
(45) Date of Patent: Aug. 19, 2014

(54) METHOD FOR DETERMINING A VIRTUAL TOOL CENTER POINT

(75) Inventor: Thomas Kohler, Gersthofen (DE)

(73) Assignee: KUKA Roboter GmbH, Augsburg (DE)

( * ) Notice: Subject to any disclaimer, the term of this patent is extended or adjusted under 35 U.S.C. 154(b) by 1694 days.

(21) Appl. No.: 12/067,108

(22) PCT Filed: Oct. 4, 2006

(86) PCT No.: PCT/EP2006/009569
§ 371 (c)(1),
(2), (4) Date: Aug. 5, 2008

(87) PCT Pub. No.: WO2007/039278
PCT Pub. Date: Apr. 12, 2007

(65) Prior Publication Data
US 2009/0299688 A1 Dec. 3, 2009

(30) Foreign Application Priority Data
Oct. 6, 2005 (DE) .......................... 10 2005 048 136

(51) Int. Cl.
*G01C 17/38* (2006.01)
*B25J 9/16* (2006.01)

(52) U.S. Cl.
CPC ..... *B25J 9/1692* (2013.01); *G05B 2219/39024* (2013.01); *G05B 2219/37555* (2013.01); *G05B 2219/39057* (2013.01)
USPC .......................................................... 702/94

(58) Field of Classification Search
USPC ............................... 702/94, 95, 159; 700/302
See application file for complete search history.

(56) References Cited

U.S. PATENT DOCUMENTS

| | | | | |
|---|---|---|---|---|
| 5,194,792 A | * | 3/1993 | Hara | 318/568.13 |
| 6,044,308 A | * | 3/2000 | Huissoon | 700/166 |
| 2005/0096892 A1 | * | 5/2005 | Watanabe et al. | 703/7 |
| 2005/0107920 A1 | * | 5/2005 | Ban et al. | 700/245 |
| 2005/0225278 A1 | * | 10/2005 | Ban et al. | 318/568.11 |
| 2008/0300723 A1 | * | 12/2008 | Ban et al. | 700/259 |

FOREIGN PATENT DOCUMENTS

| | | |
|---|---|---|
| EP | 1 527 850 A2 | 5/2005 |
| WO | 98/57782 A1 | 12/1998 |
| WO | 99/12082 A1 | 3/1999 |

OTHER PUBLICATIONS

"It's All About Your TCP", The Welding Wire, 2007.*
European Patent Office, International Search Report in International Patent Application No. PCT/EP2006/009569 dated Aug. 12, 2006.

* cited by examiner

*Primary Examiner* — Michael Nghiem
(74) *Attorney, Agent, or Firm* — Wood, Herron & Evans, LLP

(57) ABSTRACT

In order to determine a virtual sensor tool center point sensor TCP of a light section sensor, the invention provides that: the sensor TCP is placed in sufficient concordance with a point on a line on a surface a so-called feature of a reference part with a known location; a normal to the surface of the reference part is determined; the Z direction of the sensor is brought in concordance with the normal of the surface of the reference part, and; a defined alignment of the sensor with the line of the feature is determined.

14 Claims, 4 Drawing Sheets

FIG. 4

METHOD FOR DETERMINING A VIRTUAL TOOL CENTER POINT

BACKGROUND

The invention relates to a method for determining a virtual tool centerpoint in reference to a known coordinate system of a robot that has a measuring sensor for measuring objects, and a corresponding control device.

Virtual tool centerpoints (TCPs) refer to spatial coordinates and orientations that lie for example outside of real bodies such as a tool. Such points are located freely in space, and because they lack any reference to real bodies a robot cannot move to them directly. In laser processing by robot, for example, a virtual TCP lies in the focus of the laser; that is, it is located freely in space and not at a geometric point on a real body. Light section sensors are used for example by preference for readjusting during laser processing.

Light section sensors are employed to register surfaces by means of static triangulation. Here a semiconductor laser uses a linear optic unit such as a cylinder lens to produce a flat-fanned laser beam in the form of a light curtain, which strikes an object of measurement and is reflected at the so-called triangulation angle to a camera with signal processing, such as a CCD array. A signal processor analyses the laser lines reflected from the object of measurement to determine the spatial position of the object and any edge transitions. The light section sensor can thereby provide interval measurements and profile sections of the measured object.

Before the values provided by the light section sensor can be used to control a robot or to correct its robot program or for a machine in general, the measured values initially provided by the light section sensor must be made available to the robot in the latter's robot coordinate system, or else in the world coordinate system that is related to the latter in a known way. In so doing, a virtual sensor tool center point—sensor TCP—is defined, whose position is defined in the sensor coordinate system.

In particular after detaching the light section sensor and re-attaching it to the robot arm, for example after the failure of a sensor, and/or in more general terms when the attachment position is not clearly defined, the location of the sensor TCP relative to the robot coordinate system or world coordinate system has usually shifted. This shift is not known at first, and according to the invention is to be determined by simple means.

BRIEF SUMMARY

The object of the invention is therefore to specify a method whereby the position of a virtual sensor TCP relative to the robot or world coordinate system can be determined in a simple way.

Position is understood to mean at least the spatial position within a known coordinate system such as X, Y, Z. It can also include the orientations in space, such as the rotations A, B and C around the X, Y and Z axes.

According to the invention, the named problem is solved in a method of the type named at the beginning by determining the position of the virtual tool center point in reference to the known coordinate system of the robot from the known position of the virtual tool center point in reference to a sensor coordinate system and a determination of the robot axis positions for a robot position in which the virtual tool center point lies at a measuring point of a reference component.

Known coordinate systems of a robot are for example the world coordinate system, the so-called robot coordinate system, and the manual coordinate system. The positions of the robot axes are preferably measured through teaching, by means of teach functions implemented in the robot control system.

The invention also provides for the determination of a virtual TCP by means of a light section sensor in that the virtual TCP, whose position in the sensor coordinate position is known, is brought to an adequate match with a measurement point, also referred to below as a feature, for example of a reference component, this feature being in a special application case a "joint geometry," one of the types of welded joint construction, for example an overlap joint, in which two flat parts lie with one of them partially flat on top of the other; a T joint, in which a first flat part is situated perpendicular to a second flat part and the end face of the first flat part is in contact with the flat plane of the second part; or an I joint, in which the end face of the first part is in contact with an end face of the second part in such a way that that both parts are lying in the same plane. As a generality, the measurement point or feature could possibly also be referred to as a "discontinuity" in the pattern of the surface. Geometrically, it is then defined as a line or edge on a plane with a defined face normal.

One formulation of the invention provides for the perpendicular to the plane of the component to be determined by triangulation.

A preferred formulation of the method according to the invention provides that the virtual tool center point be moved to the measurement point of the reference component on the basis of measurements from the measuring sensor, where in particular the sensor is moved into spatial proximity with the measurement point of the reference component, at which position the measurement point is registered by the measurement sensor; that a difference of position between the virtual tool center point and the measurement point in the sensor coordinate system is determined by means of at least one positional value ($Y_{MESS}$, $Z_{MESS}$) measured by the measurement sensor; and that the virtual tool center point is brought into agreement with the measurement point in terms of position on the basis of that difference in position. Preferably, the sensor is brought into such spatial proximity to the measurement point of the reference component that the measurement point can be registered by the measurement sensor. A difference in orientation between the virtual tool center point and the measurement point is then determined in the sensor coordinate system by means of at least one orientation value ($A_{MESS}$, $B_{MESS}$, $C_{MESS}$) of the measurement point measured by the measurement sensor, and the virtual tool center point is then brought into agreement with the measurement point in terms of orientation on the basis of this difference in orientation.

Other alternative designs can provide that the agreement of the virtual tool center point with the measurement point be achieved by operating the robot until the virtual tool center point is located at the measurement point, or else that to simplify the manually controlled approach of the virtual tool center point to the measurement point a notification should be issued as to the manner in which the robot should proceed in order to reach the measurement point.

In the case of the first alternative, to simplify the manually controlled approach of the virtual tool center point to the measurement point, a notification is issued as to the manner in which the robot should proceed in order to reach the measurement point, while in the second alternative the agreement is achieved through automated operation of the robot until the virtual tool center point is located at the measurement point.

When light section sensors are used by preference as the measurement sensors, the measurement values from them are used to determine at least two ($Y_{MESS}$, $Z_{MESS}$) of the three spatial coordinates of the measurement point in the sensor coordinate system, and the third spatial coordinate is determined by an intersection of a straight line extending through the measurement point in the direction of the third spatial coordinate and the plane of a light curtain of the light section sensor.

It is thus possible by means of the measurement values from the light section sensor to determine a perpendicular ($Z_{MESS}$) to the surface of the reference component, and furthermore to bring a coordinate direction ($Z_{SENS}$) of the sensor coordinate system into agreement with the perpendicular ($Z_{MESS}$) to the surface of the reference component by aligning the light section sensor to the measurement position.

A preferred refinement of the method provides in addition that the measurement point is located in a line or at an edge in the surface of the reference component, and that a planar light curtain of the light section sensor is rotated around a perpendicular to the surface of the reference component until the step response of the light section sensor caused by the line or edge disappears and this orientation forms a first angular position; that the light section sensor is rotated in the opposite direction until the step response of the light section sensor caused by the line or edge again disappears and this new orientation forms a second angular position; and the angle bisector between the first and second angular positions is registered as the relevant angular orientation.

The invention also includes, in particular to carry out the method according to the invention, a control device with a display means that is designed to depict the spatial position of a virtual tool center point.

Preferred refinements of the control device according to the invention also provide that the display means is designed to display a notification about the direction in which the robot must proceed until the virtual tool center point comes to be located at the measurement point, and/or that the display means is designed to display a notification that shows when the virtual tool center point is located at the measurement point.

The invention enables teaching at a virtual TCP, which is not visible to the human eye and therefore cannot be moved to directly—mechanically—by the robot programmer. By means of the method according to the invention, the light section sensor "sees" for the robot programmer. This can be depicted visually at the control unit in such a way that the robot programmer can move to the virtual TCP by means of the depictions at the control unit.

Additional benefits and features of the invention derive from the claims and from the description below, in which one exemplary embodiment of the invention is explained in detail with reference to the drawings. The figures show the following:

BRIEF DESCRIPTION OF DRAWINGS

FIG. 4: a control device according to the invention.

DETAILED DESCRIPTION

Figure 1:
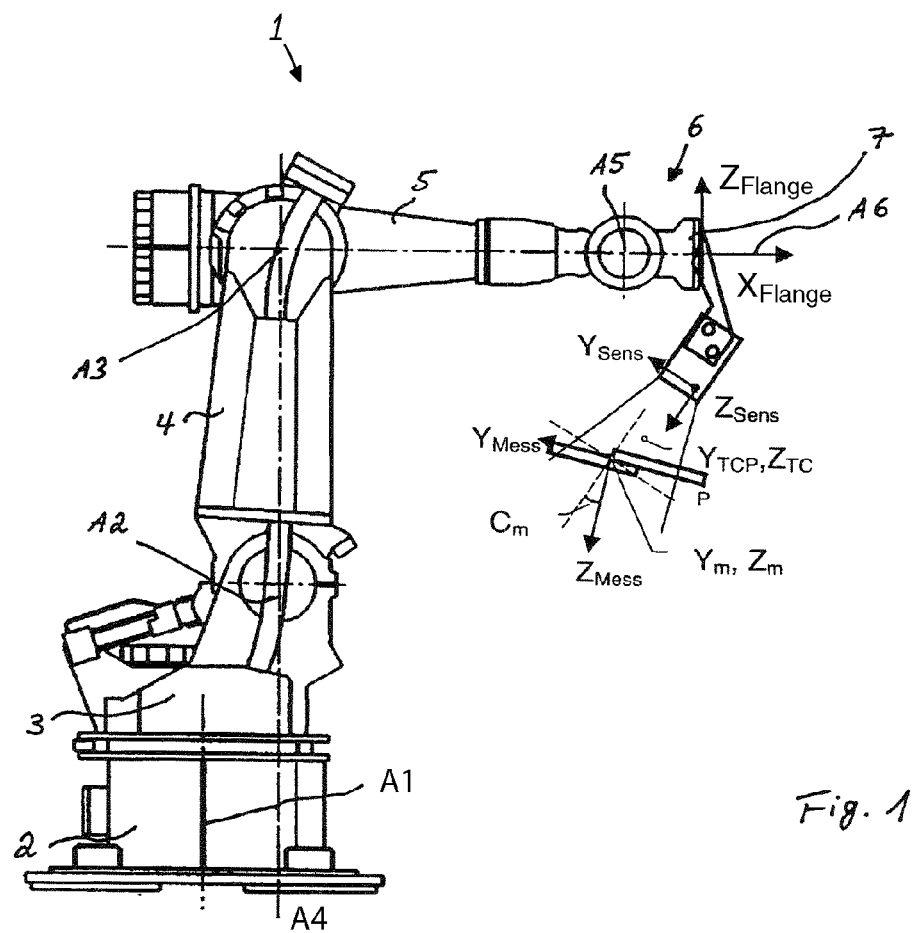
FIG. 1: a depiction of a robot according to the invention with a light section sensor attached to the robot hand, and a reference component with a feature whose position in space is known.

An industrial robot 1 has in a known manner a base 2, a carousel that is rotatable around a vertical A1 axis, a rocker arm 4 that is pivotable around a horizontal A2 axis, and a robot arm 5 at the free end of the latter that is pivotable in an articulated manner around a horizontal A3 axis, with a hand 6 situated at the free end of the latter with three axes of rotation A4 through A6. The free end of the hand 6 is formed by a flange 7. As the hand pivots around the A5 axis, the A6 axis no longer matches the A4 axis, which is true only in the special case of the extended position depicted in the drawing.

The flange 7 is used for attaching tools. In FIG. 1 a light section sensor is attached to it. The light section sensor 8 has a light source, preferably in the form of a semiconductor laser, which produces a laser beam that is flat-fanned from its Y-Z plane—a light curtain 10; also a detector such as a camera, preferably in the form of a CCD array.

The light section sensor 8 has its own coordinate system. The Y direction $Y_{SENS}$ and the Z direction $Z_{SENS}$ in the sensor coordinate system are depicted in the figures, while the X direction $X_{SENS}$ is oriented firmly perpendicular to the plane of the page in the depicted orientation. A virtual tool center point—TCP 15—is assigned to the sensor at the location $X_{TCP}$, $Y_{TCP}$, $Z_{TCP}$ in the sensor coordinate system.

Also depicted is a reference component 11 having a measurement point or feature 12. In the specific exemplary embodiment the feature 12 consists of a step in a reference component 11. The X coordinate $X_{MESS}$ of the measurement point runs along the longitudinal course of the step. The Z coordinate $Z_{MESS}$ of the measurement point runs perpendicular to the surface 14 of the reference component.

Figure 2:
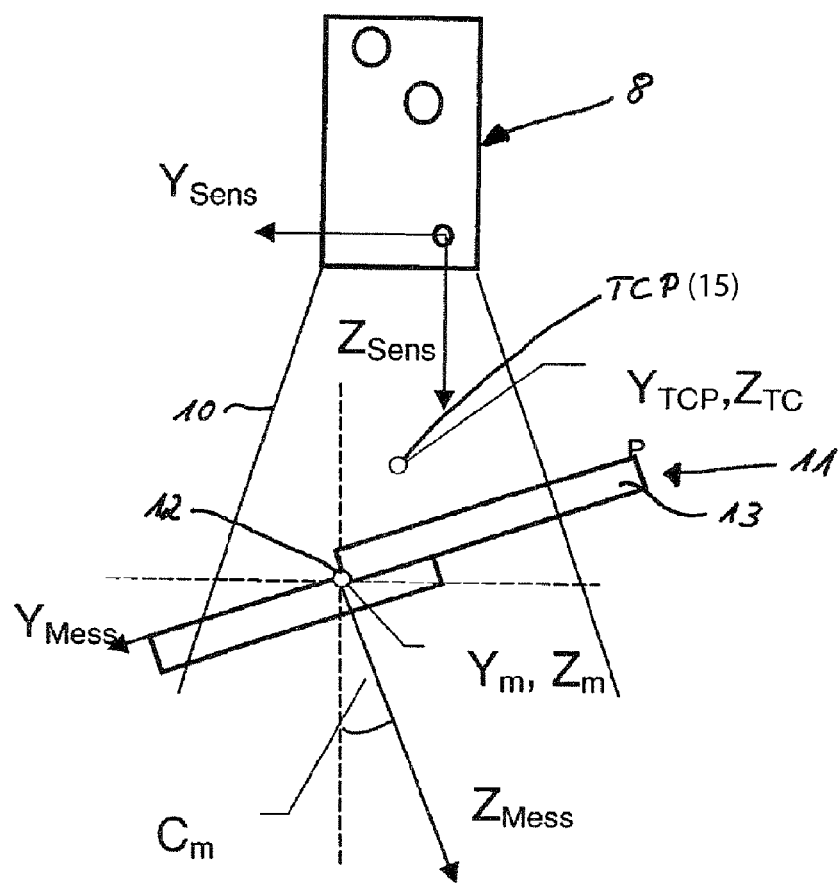
FIG. 2: an enlarged depiction of the light section sensor with the reference component of FIG. 1.

As can be discerned from FIG. 2, first the robot hand is moved by shifting the individual robot axes so that the feature 12 come into the field of view or viewing window of the CCD camera. The sensor then produces a signal that the feature 12 has been detected. This arrival in the target window can also be announced visually or audibly for example on an operating unit. As soon as the sensor has registered feature 12, light section sensor 8 determines the position of feature 12 in both the Y direction $Y_{SENS}$ and the Z direction $Z_{SENS}$ of the sensor coordinate system. From the actual present position of feature 12 in reference to the coordinate system of light section sensor 8 and the mathematically known position of the virtual TCP 15 in reference to the coordinate system of light section sensor 8, the difference in the positions of feature 12 and the virtual TCP is determined. Next, the robot arm is moved forward (+) or backward (−) in the direction $Y_{SENS}$ or $Z_{SENS}$ until the corresponding coordinates of feature 12 and of virtual TCP 15 are (adequately) matched. The robot can either be moved automatically by a control system, or a robot operator is requested to move the robot manually in an appropriate way.

The movement of the virtual TCP 15 to feature 12 in the Z direction $Z_{SENS}$ of the sensor coordinate system until they agree at least approximately is accomplished in the same way, with the position of the feature in the Z direction $Z_{SENS}$ being determined by light section sensor 8 according to the known method of static triangulation.

In this way the virtual TCP 15 is brought to agreement with the feature 12; this can be accomplished manually or automatically.

It is not necessary to achieve exact agreement, but rather a certain tolerance R is acceptable, with the breadth of tolerance being on the order for example of one to five times the sensor resolution, i.e. for example 1 mm. Exact positioning is not necessary, since despite the inexactness of the positions moved to, the actual location of the TCP can be calculated mathematically exactly by means of known three-point and four-point methods.

The third coordinate X is always zero, since light section sensor 8 produces a flat beam, that is, a light curtain that has no spatial extension in the X direction, i.e. that is infinitesimally small or thin. On the condition that the system has first produced a "Feature reached" and a signal, there is assurance that feature 12 is located in the Y direction in the plane of the light curtain of light section sensor 8.

All in all, it is possible from the thus-measured actual present position of feature 12 in reference to the coordinate system of light section sensor 8 and the mathematically known position of the virtual TCP 15 in the coordinate system of the light section sensor to ascertain the difference in position between feature 12 and virtual TCP 15, and to determine the position of the latter in the world or robot coordinate system.

In addition, it is possible to ascertain at least two of three angular positions.

Figure 3:
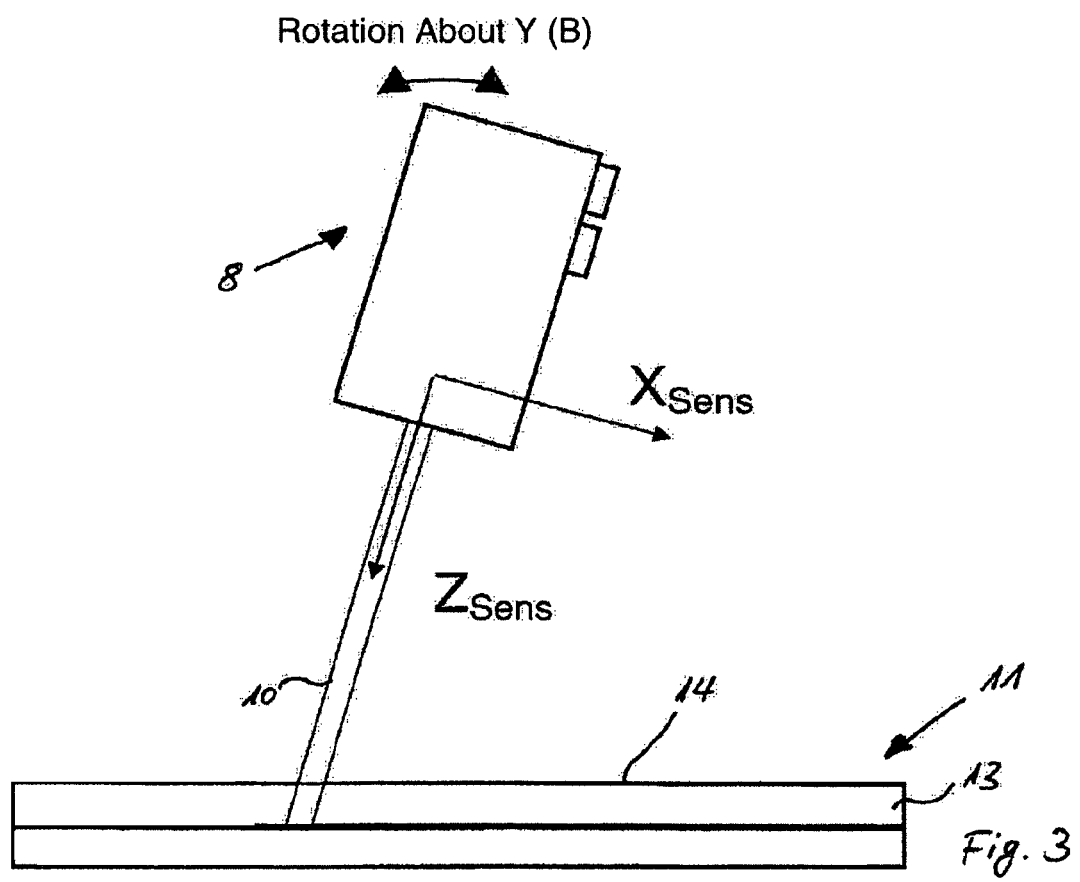
FIG. 3: the light section sensor of FIG. 2 in a side view.

To determine the first angular position, the flat sensor beam is first rotated around an X direction with respect to reference component 11 or feature 12, as depicted in FIG. 2. As this is done, the normal of the surface of reference component 1 is computed by means of the known triangulation method of light section sensor 8. The Z direction $Z_{SENS}$ of the sensor's own coordinate system is known. Light section sensor 8 is pivoted, and during the pivoting the Z direction $Z_{SENS}$ of light section sensor 8 is measured relative to the calculated normal of the Z direction $Z_{MESS}$ of feature 12. The motion continues until the relative angle between $Z_{SENS}$ und $Z_{MESS}$ reaches zero. Next, light section sensor 8 is rotated around its Y direction, as depicted in FIG. 3, and as this is done the distance between light section sensor 8 and feature 12 is measured. The rotation should be in the direction in which the measured distance values become continuously smaller. As soon as the measured values begin to grow larger again, the turning point is recognized at which the distance is smallest. In this rotational position, the Y direction of light section sensor 8 is vertical on reference component 11.

Thus the Z direction $Z_{SENS}$ of light section sensor 8 matches the Z direction $Z_{MESS}$ of feature 12.

In a further step, a second angle is determined. To that end, light section sensor 8 is rotated around its own Z axis $Z_{SENS}$, with the known axis as the axis of rotation intersecting the edge of feature 12 with sufficient precision. As soon as the flat-fanned light beam of light section sensor 8 is in the Y direction $Y_{MESS}$ of the edge, the step response in the signal produced by light section sensor 8, which is otherwise there because of the edge, disappears, and the angular position is detected whereby the Y direction $Y_{SENS}$ of light section sensor 8 is brought to a certain agreement with the Y direction of feature 12 or of the edge of reference component 11.

To increase precision, light sensor 8 can be rotated again, in the same direction or contrary to the prior direction—this time for example by 180°—until the direction of the flat light beam again matches the edge, i.e. so that the step response again disappears. The angular position between the two registered (Y) angular positions, as a second angular position, is registered as the second angular orientation of the virtual TCP 15.

The third angular position is derived in the Cartesian coordinate system as the perpendicular to the two previously determined angular positions.

The virtual TCP 15 is now congruent with feature 12 or with the measurement point, both in regard to its three orientations and in regard to its position in the Cartesian coordinate system. This position is then taught by the usual three-point or four-point methods, which gives an unambiguous determination of the position of the virtual TCP 15 in the robot or world coordinate system.

Figure 4:
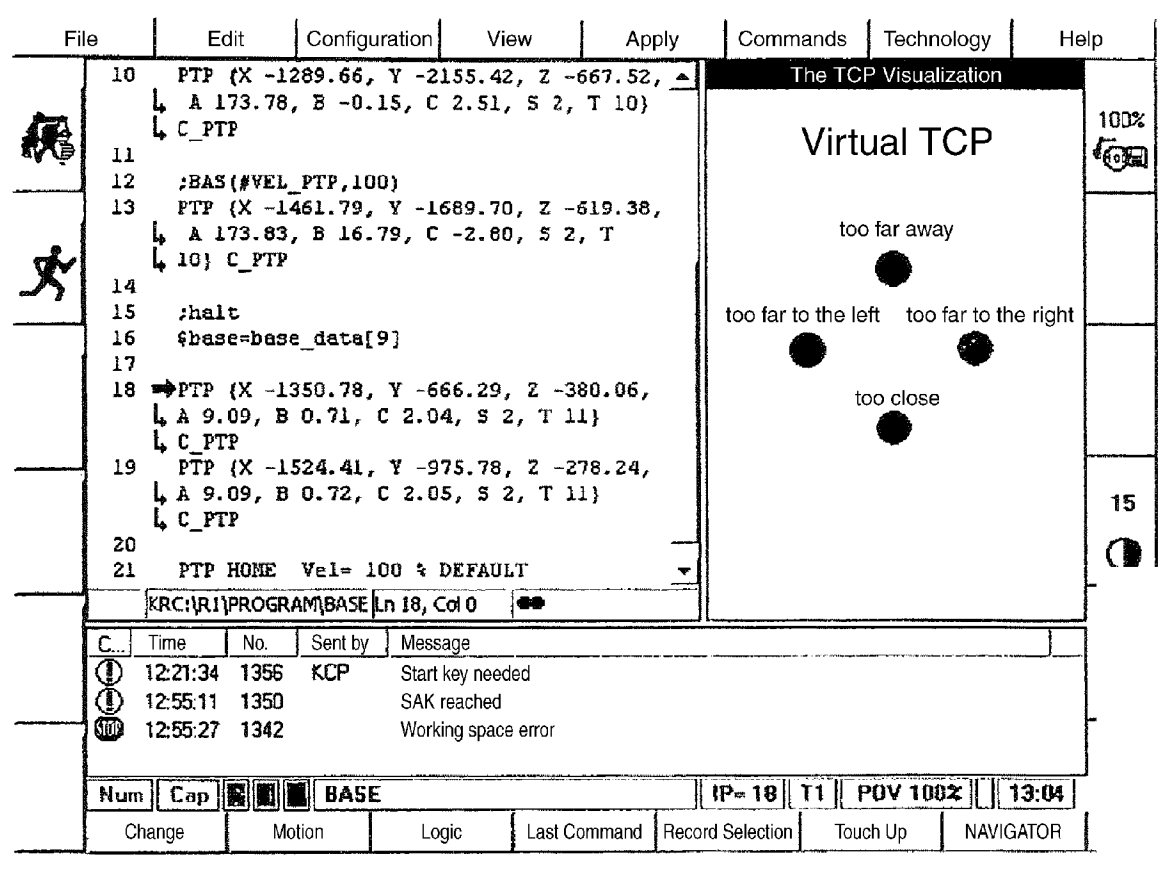

FIG. 4 illustrates a display means of a control device according to the invention. While numerical information is given in the left part and messages in the bottom field, the control device according to the invention is designed to indicate the spatial position of a virtual tool center point in the right part of the display means. In the illustration in FIG. 4 the latter is not at the spatial position of a measurement sensor, but rather too far to the left and too far away. Accordingly, the identifiers in the display for "too far away" and "too far to the left" light up, signaling the absence of spatial proximity of the measuring sensor to a measurement point of a reference component and showing the direction in which the robot must travel to bring the virtual tool center point to the measurement point. The measurement sensor returns to the display the position of the feature relative to its coordinate step. The display is achieved by comparing the measured positions with the tool center point, which causes the necessary direction of travel to be indicated. When the measurement sensor comes into sufficiently close proximity to a measurement point of a reference component, and the measurement point accordingly is detectable by the measurement sensor, the area defined by the display of the measurement point can be depicted within the area defined by the light spots of the display, and thus a notification that the virtual tool center point is located at the measurement point (allowing for the specified tolerance or within adequate proximity).

The invention claimed is:

1. A method of determining the position of a virtual tool center point used with a robot relative to a known coordinate system of the robot, the method comprising:
    sensing the position and orientation of a measurement point of a reference component in a sensor coordinate system using a sensor associated with the robot;
    determining the differences in position and orientation between the measurement point and the virtual tool center point in the sensor coordinate system; and
    moving the virtual tool center point to be in registration with the measurement point;
    wherein determining a difference in position between the measurement point and the virtual tool center point comprises sensing at least one positional value along a coordinate axis in the sensor coordinate system, and wherein moving the virtual tool center point to be in registration with the measurement point is based on the determined difference in position; and
    wherein the method further comprises bringing the sensor into spatial proximity with the measurement point such that the measurement point can be sensed by the sensor.

2. The method of claim 1, wherein determining the differences in position and orientation between the measurement point and the virtual tool center point comprises measuring the differences using preprogrammed algorithms implemented by a robot control system associated with the robot.

3. The method of claim 1, wherein moving the virtual tool center point to be in registration with the measurement point is based on the sensed position and orientation of the measurement point.

4. The method of claim 3, wherein moving the virtual tool center point comprises operating the robot until the virtual tool center point is located at the measurement point.

5. The method of claim 4, wherein the virtual tool center point is manually moved in accordance with instructions for reaching the measurement point that are determined by the robot control system.

6. The method of claim 1, wherein:
determining a difference in orientation between the measurement point and the virtual tool center point comprises sensing at least one orientation value about a coordinate axis in the sensor coordinate system; and
wherein the method further comprises moving the virtual tool center point to be in registration with the measurement point based on the determined difference in orientation.

7. The method of claim 1, wherein moving the virtual tool center point to be in registration with the measurement point comprises computing the difference in position between the measurement point and the virtual tool center point and including the difference in the position data of a robot program.

8. The method of claim 7, wherein moving the virtual tool center point to be in registration with the measurement point comprises automated operation of the robot until the virtual tool center point is located at the measurement point.

9. A method of determining the position of a virtual tool center point used with a robot relative to a known coordinate system of the robot, the method comprising:
sensing the position and orientation of a measurement point of a reference component in a sensor coordinate system using a sensor associated with the robot;
determining the differences in position and orientation between the measurement point and the virtual tool center point in the sensor coordinate system;
moving the virtual tool center point to be in registration with the measurement point;
wherein the sensor is a light section sensor;
determining at least two of three spatial coordinates of the measurement point in the sensor coordinate system using the light sections sensor; and
determining the third spatial coordinate by an intersection of a straight line extending through the measurement point with the plane of a light curtain emitted by the light section sensor, wherein the straight line extends in the direction of the third spatial coordinate.

10. The method of claim 9, further comprising:
determining a perpendicular direction relative to a surface of the reference component using measurement values sensed by the light section sensor; and
orienting the light section sensor to the measurement point to bring a coordinate direction of the sensor coordinate system into registration with the determined perpendicular direction.

11. The method of claim 10, wherein the measurement point is located in a line or at an edge in the surface of the reference component, the method further comprising:
establishing a first angular position by rotating the planar light curtain emitted by the light section sensor around an axis perpendicular to the surface of the reference component until a step response caused by the line or edge is no longer sensed;
establishing a second angular position by rotating the planar light curtain emitted by the light section sensor around the axis perpendicular to the surface of the reference component in an opposite direction until a step response caused by the line or edge is no longer sensed; and
determining an angle bisector between the first and second angular positions.

12. A method of determining the position of a virtual tool center point used with a robot relative to a known coordinate system of the robot, the method comprising:
sensing the position and orientation of a measurement point of a reference component in a sensor coordinate system using a sensor associated with the robot;
determining the differences in position and orientation between the measurement point and the virtual tool center point in the sensor coordinate system;
moving the virtual tool center point to be in registration with the measurement point;
displaying a depiction of the spatial position of the virtual tool center point on an output device; and
displaying a notification of the presence or absence of spatial proximity of the sensor relative to the measurement point such that the measurement point is detectable by the sensor.

13. A method of determining the position of a virtual tool center point used with a robot relative to a known coordinate system of the robot, the method comprising:
sensing the position and orientation of a measurement point of a reference component in a sensor coordinate system using a sensor associated with the robot;
determining the differences in position and orientation between the measurement point and the virtual tool center point in the sensor coordinate system;
moving the virtual tool center point to be in registration with the measurement point;
displaying a depiction of the spatial position of the virtual tool center point on an output device; and
displaying a notification of the direction that the robot must proceed to locate the virtual tool center point in registration with the measurement point.

14. The method of claim 13, further comprising:
displaying a notification that the virtual tool center point is in registration with the measurement point.

* * * * *